United States Patent [19]
Park

[11] Patent Number: 5,949,644
[45] Date of Patent: *Sep. 7, 1999

[54] COMPUTER SYSTEM CAPABLE OF EASILY EXTENDING FUNCTIONS

[75] Inventor: Sang-Seok Park, Suwon-si, Rep. of Korea

[73] Assignee: SamSung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/770,514

[22] Filed: Dec. 20, 1996

[30] Foreign Application Priority Data

Dec. 28, 1995 [KR] Rep. of Korea ...................... 95-61850

[51] Int. Cl.⁶ ................................. G06F 1/16; H05K 7/10
[52] U.S. Cl. ........................... 361/686; 361/725; 361/729
[58] Field of Search .................................... 361/683, 685, 361/686, 724–727, 729; 364/708.1; 439/493; 312/223.1, 223.2; G06F 1/16

[56] References Cited

U.S. PATENT DOCUMENTS

| | | |
|---|---|---|
| 4,401,351 | 8/1983 | Record . |
| 4,501,460 | 2/1985 | Sisler . |
| 4,680,674 | 7/1987 | Moore ..................................... 361/685 |
| 4,688,864 | 8/1987 | Sorel . |
| 4,812,135 | 3/1989 | Smith ..................................... 439/493 |
| 4,969,830 | 11/1990 | Daly et al. . |
| 4,979,636 | 12/1990 | Daly . |
| 5,097,388 | 3/1992 | Buist et al. . |
| 5,156,556 | 10/1992 | Ma . |
| 5,311,397 | 5/1994 | Harshberger et al. ................... 361/683 |
| 5,430,607 | 7/1995 | Smith ..................................... 361/683 |
| 5,493,194 | 2/1996 | Damiano et al. . |
| 5,508,886 | 4/1996 | Bernecker et al. . |
| 5,515,239 | 5/1996 | Kamerman et al. ..................... 361/727 |
| 5,602,721 | 2/1997 | Slade et al. ............................. 361/727 |

*Primary Examiner*—Lynn D. Feild
*Attorney, Agent, or Firm*—Robert E. Bushnell, Esq.

[57] ABSTRACT

Disclosed is a main unit and at least one expansion unit having a housing that contains a jack extending from the top of the housing and a plug extending from the bottom of the housing, the jack of one module mating with the jack of another module. Each module, including the main unit, each contain at least one circuit panel between the jack and the plug. A rigid, non-flexible connector electrically connects the jack and the plug of each unit to the circuit panel. In addition, the top side of each panel contains a flange around the periphery of the top side that mates with a recess that runs around the periphery of the bottom side of an adjoining module to attach the two modules together.

19 Claims, 5 Drawing Sheets

COMPUTER SYSTEM CAPABLE OF EASILY EXTENDING FUNCTIONS

CLAIM OF PRIORITY

This application makes reference to, incorporates the same herein, and claims all benefits accruing under 35 U.S.C. §119 arising from an application for A Computer System Capable of Easily Extending Functions earlier filed in the Korean Industrial Property Office on Dec. 28, 1995 and there duly assigned Ser. No. 61850/1995.

FIELD OF THE INVENTION

The present invention relates to a computer system capable of easily extending functions, more particularly, to the computer system which can add or upgrade functions by connecting connectors without disassembling the computer system.

BACKGROUND OF THE INVENTION

The notion of expandable computer modules is not new. For example, U.S. Pat. No. 5,156,556 for an Office Automation Unit to Ma discloses device that has a flange running around the periphery of a main unit which connects with a recess running around the periphery of an expansion unit of a computer. In addition, an electric connector positioned on the bottom of the main unit connects with an electric connector on the top of the expansion unit, thus electrically connecting the two devices together. Ma '556 uses a flexible cable to electrically connect the jack with the plug and to connect the jack and the plug to circuit panels.

What is needed is an expandable computer unit that uses only rigid, non flexible electrical connections between the modules. Rigid, non-flexible electrical connectors are easier to instal and remove, as they do not require screws or special tools, and they are less apt to come loose once installed.

SUMMARY OF THE INVENTION

It is therefore an object to provide an improved expandable computer system.

It is also an object to provide a modularly expandable computer system that uses only rigid, non-flexible electrical connectors to connect the electrical connectors to the circuit panels and to connect one expansion module to the main unit.

These and other objects may be achieved by having a main unit and at least one expansion unit having a housing that contains a jack extending from the top of the housing and a plug extending from the bottom of the housing, the jack of one module mating with the jack of another module. Each module, including the main unit, each contain at least one circuit panel between the jack and the plug. A rigid, non-flexible connector electrically connects the jack and the plug of each unit to the circuit panel. In addition, the top side of each panel contains a flange around the periphery of the top side that mates with a recess that runs around the periphery of the bottom side of an adjoining module to attach the two modules together. The flange extends further off the housing surface than the plug, thus protecting the plug from inadvertent damage during handling and during installation.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
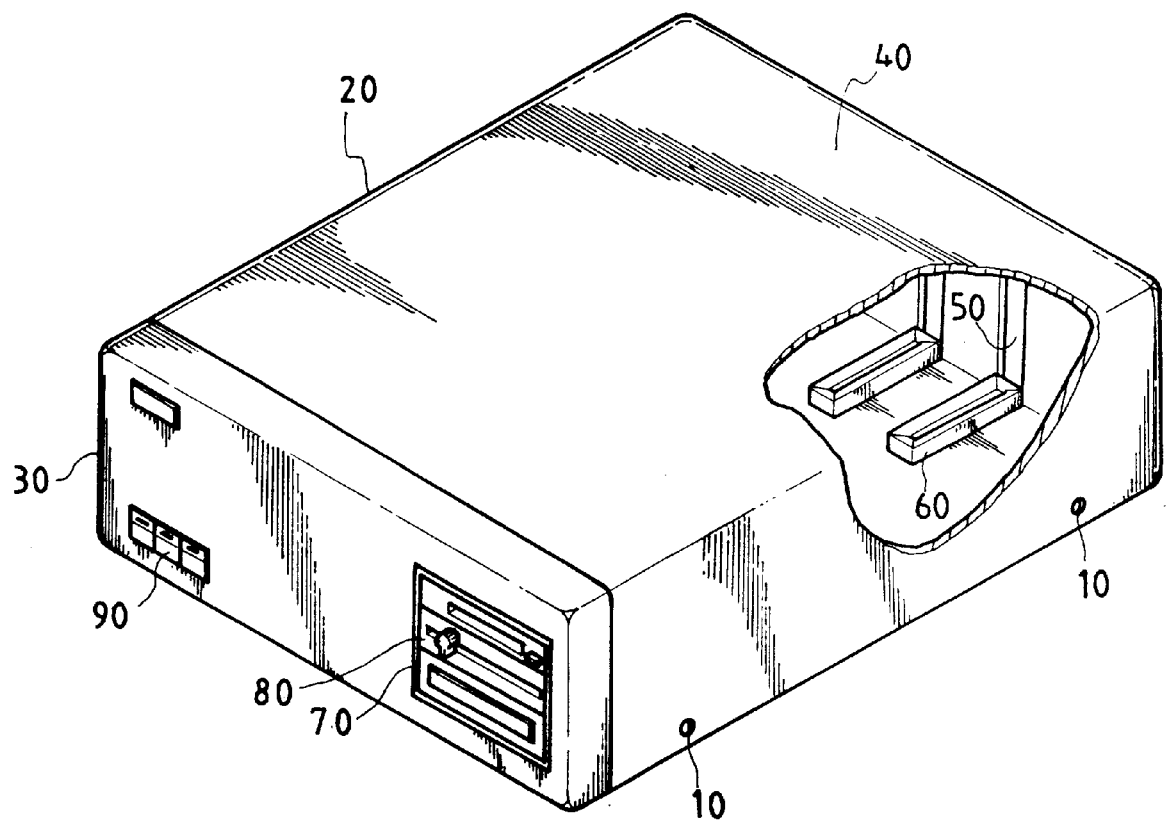
FIG. 1 is a partial sectional perspective view of an earlier computer system for extending functions by disassembling the computer.

FIG. 1 is a partial sectional perspective view of an earlier computer system for extending functions by disassembling the computer. As shown in FIG. 1, the earlier computer system for extending functions includes an upper plate 20 of a computer, a lower plate 40 of the computer, a front section 30 of the computer, a screw 10 which connects the upper plate 20 with the lower plate 40 of the computer, an expansion module 80 extending computer functions, a driver securing plate 70 securing the expansion module, a slot 60 mounting an expansion card; an expansion card securing plate 50 securing the expansion card, and an operation panel 90 for turning on and off the power to the computer system. The expansion card must be mounted to the slot in order to add a computer function.

So, first, the user separates the upper plate 20 from the lower plate 40 of the computer after removing the securing screws 10. And, the user mounts the expansion card to the slot 60 secured to the lower plate 40 of the computer, connects the expansion card to the card securing plate 50, connects the upper plate 20 to the lower plate 40 of the computer, and tightens the securing screws 10. In case of a device whose one side should be exposed outside of the computer, such as a floppy disk drive, the upper plate 20 should be engaged with the lower plate 40 of the computer after the device is secured to the driver securing plate 70.

Figure 2:
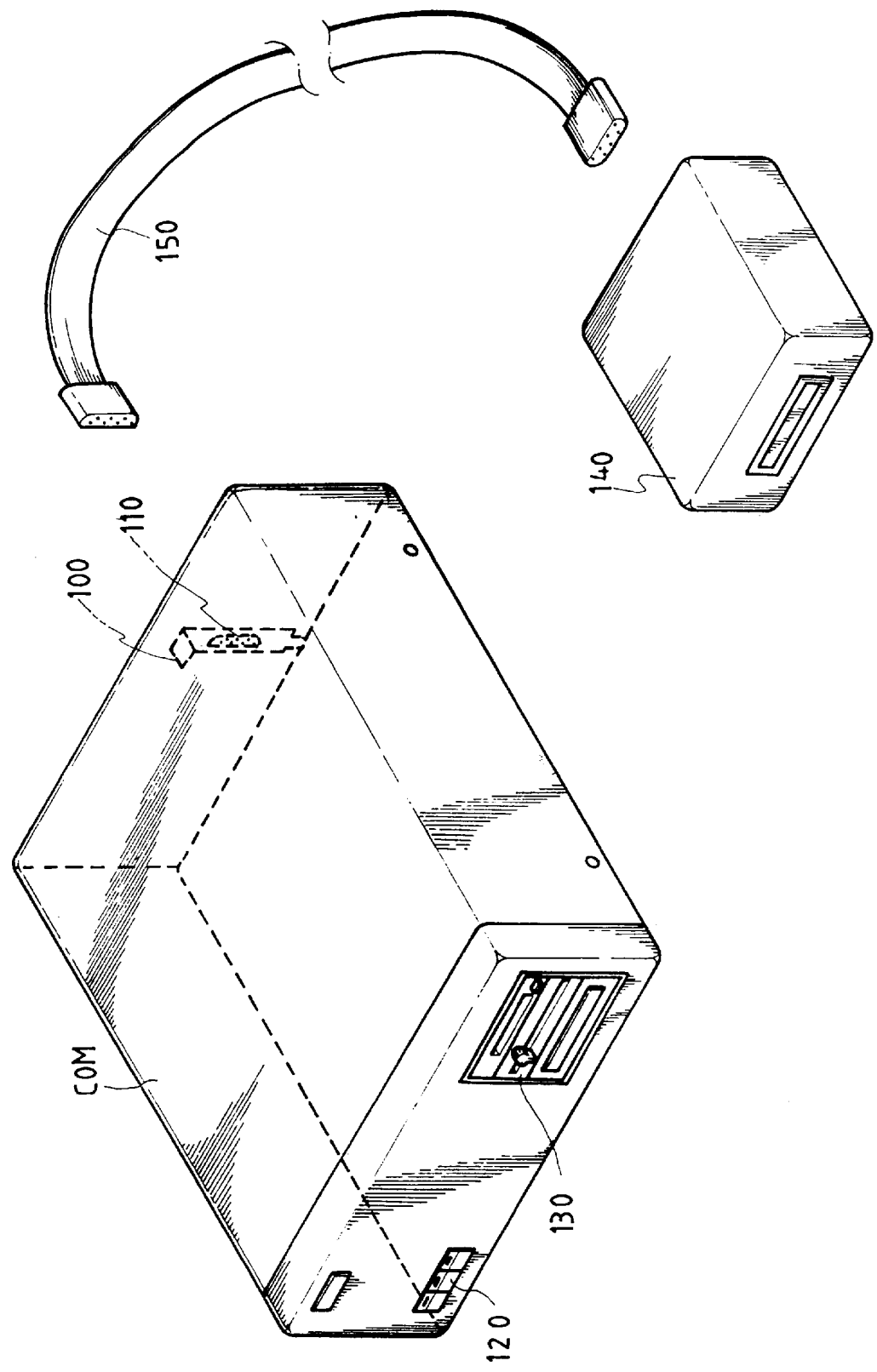
FIG. 2 is a perspective view of another earlier computer system for extending functions by connecting with a cable.
Figure 3:
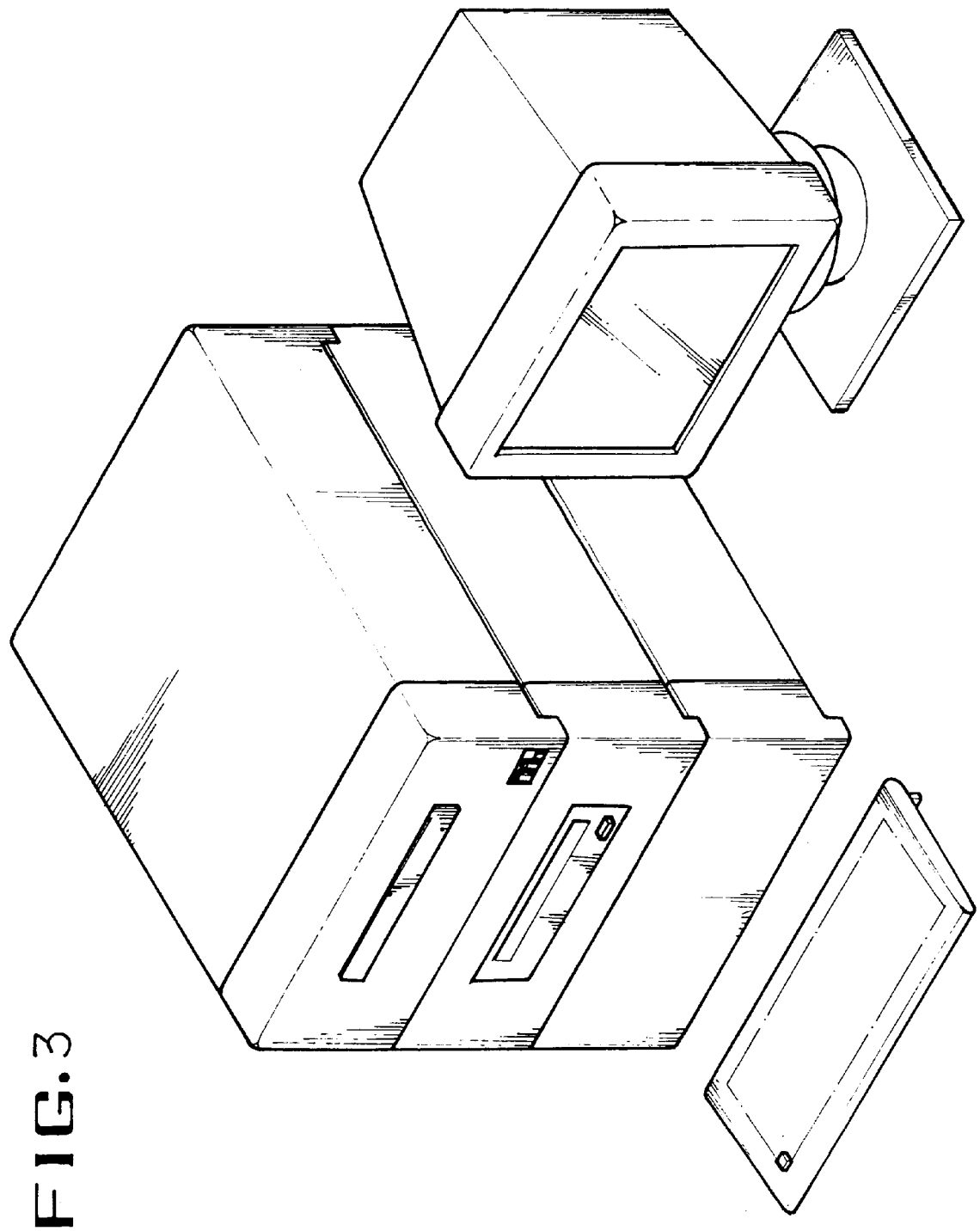
FIG. 3 is a perspective view of a computer system capable of easily extending functions in accordance with the preferred embodiment of the present invention.

FIG. 2 is a perspective view of another earlier computer system for extending functions by connecting to a cable. As shown in FIG. 2, the earlier computer system for extending functions by connecting to a cable includes a computer body COM, an embedded expansion device 130 for extending functions of the computer body, a card securing plate 100 securing the expansion card, an external expansion device 140 extending a function of the computer body in external a cable 150 which connects the external expansion device 140 to the computer body COM, a connector 110 which is fixed to the card securing plate 100 and is connected to the cable 150, and an operation panel 120 operating the operation like as the power of the computer body COM.

In order to add an expansion of the computer, the expansion card and the interface card is added in the disassembled computer body in FIG. 1, and the external expansion device is connected to the computer body, without being disassembled, by the connector cable as shown in FIG. 2.

However, the earlier invention has the problem of disassembling the computer and is limited as to the number of extending functions. Also, in case of adding a function by using a cable, the cable used for the external expansion device is more expensive than it used for the embedded expansion device, and the electro magnetic interference noise is produced in the connected cable. A preferred embodiment of the present invention will become apparent from a study of the following detailed description with reference to the accompanying drawings.

Figure 4:
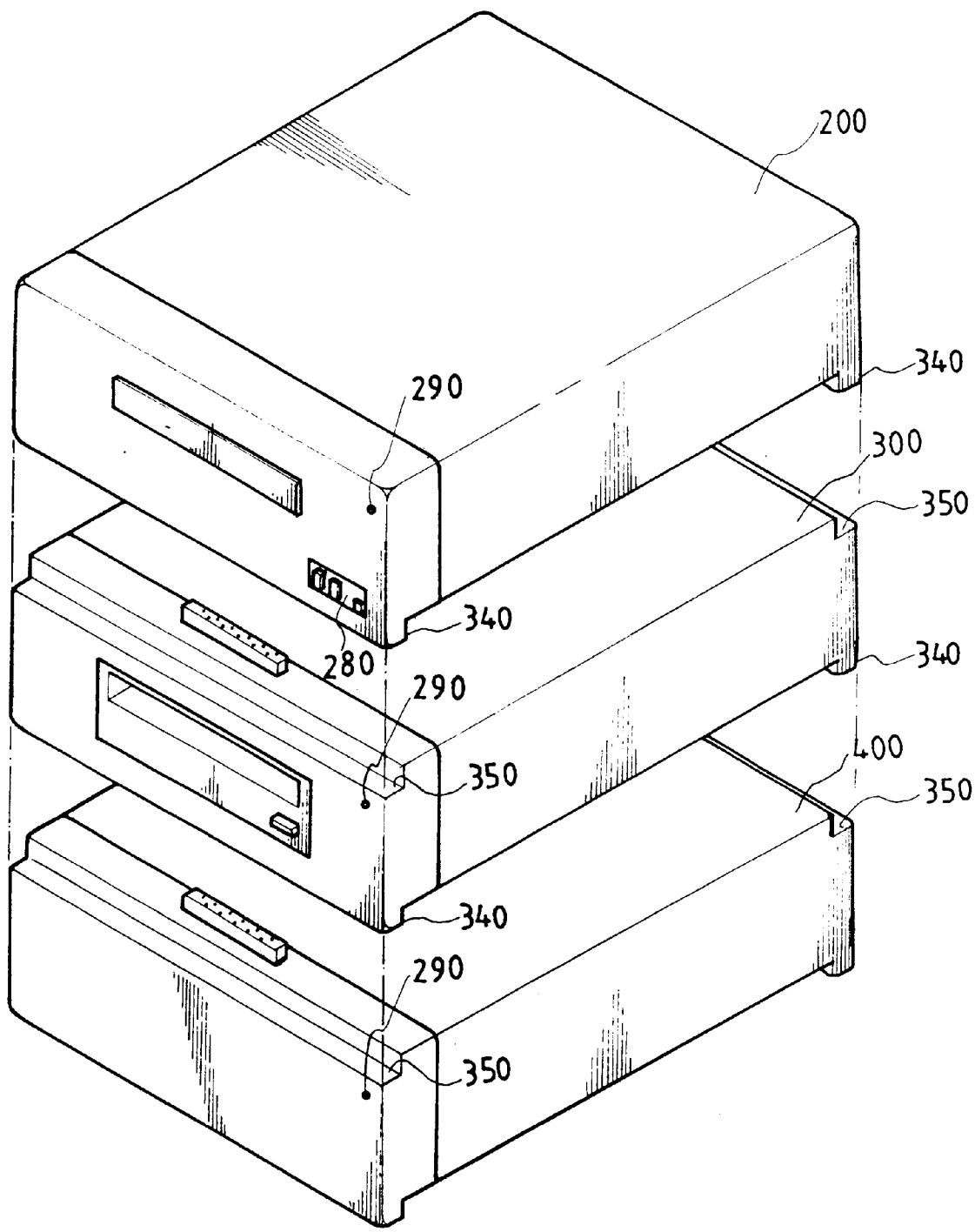
FIG. 4 is an exploded perspective view of a computer system capable of easily extending functions in accordance with the preferred embodiment of the present invention.

As shown in FIG. 4, a computer system capable of easily extending functions in accordance with the preferred embodiment of the present invention includes a main computer 200 which controls the computer system and processes data, a first expansion device 300 which is connected to the main computer and extends the functions of the computer system, and a second expansion device 400 which is connected to the first expansion device 300 and further extend the functions of the computer system. The main computer 200 and the plurality of expansion devices includes a connector 330 and an operation display section 290. The main computer 200 further includes an operation panel 280 which supplies power to the computer system and resets the computer system.

Figure 5:
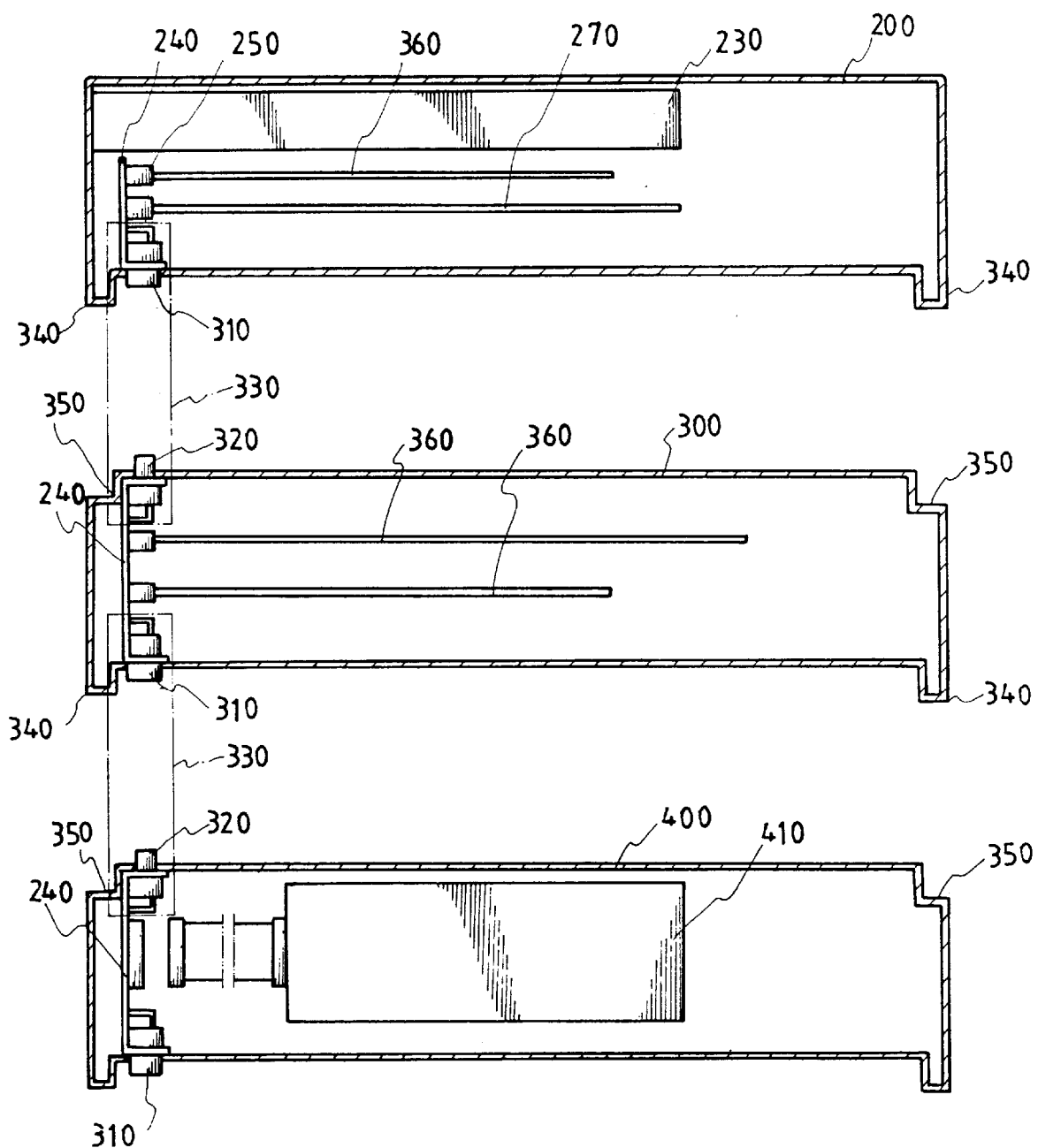
FIG. 5 is a cross sectional view of a computer system capable of easily extending functions in accordance with the preferred embodiment of the present invention.

As shown in FIG. 5, the computer system capable of easily extending functions in accordance with the preferred embodiment of the present invention includes a program for booting and controlling a computer, a main board 270, a CDROM 230, a circuit panel 360 which practically controls the operations and the functions of the computer system and interfaces a subject of control to the computer system, a rigid and inflexible connector panel 240 which connects with address, data and control lines of the circuit panel, a slot 250 which connects with the circuit panel and connector panel, and makes the circuit panel fix, a hard disk drive 410, and a connector 330 for connecting the expansion devices to each other.

The plurality of expansion devices includes a jack 320 which is projected outwardly from an upper side of the plurality of expansion devices, a plug 310 which is projected outwardly from a lower side of the plurality of expansion devices, recess section 350 which engaged with a flange 340 of the main computer, and flange 340 which is projected longer than the plug 310 so that plug 310 may be protected from damage during handling and during installation. The operation in accordance with the preferred embodiment of the present invention is as follows. First, the main board 270 and the CD-ROM 230 must be mounted in the main computer 200. The main board 270 and the circuit panel 360 are mounted to the slot 250 connected to the connector panel 240. The main board 270 is connected to the connector 330 through the connector panel 240 so as to transmit address, data, and control signals. Also, the circuit panel 360 is connected to the slot 250 and fixed within the first expansion device 300. The connector panel 240 is connected to the jack 320 for connecting the main computer. Plug 310 is connected to jack 320 of the first expansion device 300. Also, plug 310 connected to the connector panel 240 is mounted to the lower plate of the first expansion device 300. The plurality of expansion devices are engaged with the main computer by their own configuration, each having a flange and a recess section. The hard disk drive 410 is mounted in the second expansion device 400 and is connected to the connector panel 240. The expansion devices having the functions to be extended are engaged with the computer body through the connector 330. That is, the function of the computer system is extended by separating the input/output slot from the main board of the general computer.

As the above embodiments, this invention does not use a separate cable and disassembling of the computer body, and is not affected by the electro magnetic interference noise. And, the function of the computer system is not limited and is added easily.

What is claimed is:

1. A computer system capable of easily extending functions, comprising:

a main unit having a housing which includes a top surface, a bottom surface and a side surface, said bottom surface containing a flange extending from opposite sides of said bottom surface of said housing and a plug extending from said bottom surface of said housing of said main unit, said main unit having at least one circuit panel located between said top surface and said plug; and a first expansion unit having a housing which includes a top surface, a bottom surface and a side surface, said top surface having a recess formed on opposite sides of said top surface to matingly engage said flange extending from said opposite sides of said bottom side of said main unit, said top surface of said first expansion unit having a jack extending from said top surface of said housing of said first expansion unit to matingly engage said plug extending from said bottom surface of said housing of said main unit, thereby electrically connecting and snugly fitting said first expansion unit to said main unit, said first expansion unit having at least one circuit panel located between said jack of said first expansion unit and said bottom surface of said first expansion unit;

wherein each said at least one circuit panel of said first expansion unit is electrically connected to said jack of said first expansion unit by a rigid connector panel extending continuously and vertically between said top and bottom surfaces of said first expansion unit and substantially perpendicular to said at least one circuit panel, said rigid connector electrically connecting each said at least one circuit panel of said first expansion unit to said jack of said first expansion unit; and wherein at least one slot is formed on said rigid connector for receiving and supporting said at least one circuit panel.

2. The computer system of claim 1, said flange extending further from said bottom surface of said main unit than said plug, preventing damage to said plug of said main unit.

3. A computer system capable of easily extending functions, comprising:

a main unit having a housing which includes a top surface, a bottom surface and a side surface, said bottom surface containing a flange extending from opposite sides of said bottom surface of said housing and a plug extending from said bottom surface of said housing of said main unit, said main unit having at least one circuit panel located between said top surface and said plug; and a first expansion unit having a housing which includes a top surface, a bottom surface and a side surface, said top surface having a recess formed on opposite sides of said top surface to matingly engage said flange extending from said opposite sides of said bottom side of said main unit, said top surface of said first expansion unit having a jack extending from said top surface of said housing of said first expansion unit to matingly engage said plug extending from said bottom surface of said housing of said main unit, thereby electrically connecting and snugly fitting said first expansion unit to said main unit, said first expansion unit having at least one circuit panel located between said jack of said first expansion unit and said bottom surface of said first expansion unit;

wherein each said at least one circuit panel of said main unit is electrically connected to said plug of said main unit by a rigid connector panel extending continuously and vertically between said top and bottom surfaces of said main unit and substantially perpendicular to said at least one circuit panel said rigid connector panel electrically connecting each said at least one circuit panel of said main unit to said plug of said main unit; and wherein at least one slot is formed on said rigid connector panel for receiving and supporting said at least one circuit panel.

4. The computer system of claim 3, further comprising:

a flange extending from said bottom surface on opposite sides of said bottom surface of said housing of said first extension unit and a plug extending from said bottom surface of said housing of said first expansion unit, and a second expansion unit having a housing which includes a top surface, a bottom surface and a side surface, said top surface of said second expansion unit having a recess formed on opposite sides thereof and matingly engaging said flange extending from said opposite sides of said bottom surface of said first expansion unit, said top surface of said second expansion unit having a jack extending from said top surface of said housing of said second expansion unit that matingly engages said plug extending from said bottom surface of said housing of said first expansion unit and electrically connects said second expansion unit to said first expansion unit, said second expansion unit having at least one circuit panel located between said jack of said second expansion unit and said bottom surface of said second expansion unit.

5. The computer system of claim 4, each said at least one circuit panel of said second expansion unit being electrically connected to said jack of said second expansion unit by an additional rigid connector panel extending continuously and vertically between said top and bottom surfaces of said second expansion unit.

6. The computer system of claim 5, wherein said additional rigid connector panel includes support means for receiving and supporting an end of said at least one circuit panel.

7. The computer system of claim 6, wherein said support means comprises a slot formed in a surface of said additional rigid connector panel.

8. The computer system of claim 4, each said at least one circuit panel of said first expansion unit being electrically connected to said plug of said first expansion unit by an additional rigid connector panel extending continuously and vertically between said top and bottom surfaces of said first expansion unit.

9. The computer system of claim 8, wherein said additional rigid connector panel includes support means for receiving and supporting an end of said at least one circuit panel.

10. The computer system of claim 9, wherein said support means comprises a slot formed in a surface of said additional rigid connector panel.

11. The computer system of claim 4, said flange extending further from said bottom surface of said first expansion unit than said plug, preventing damage to said plug of said first expansion unit.

12. A computer system including a plurality of computer modules, each module having a housing comprising:

a top surface having a recess formed on opposite sides of said top surface and having a jack extending from said top surface;

a bottom surface having a flange extending from opposite sides of said bottom surface, said bottom surface having a jack extending from said bottom surface; and at least one circuit panel disposed between said top surface and said bottom surface, each said at least one circuit panel being electrically connected to said jack and to said plug via an inflexible connector panel extending continuously and vertically between said top and bottom surfaces and substantially perpendicular to said at least one circuit panel;

wherein at least one slot is formed on said inflexible connector panel for receiving and supporting said at least one circuit panel.

13. The computer system of claim 12, said flange extending further from said bottom surface than said plug, preventing damage to said plug of said each module.

14. The computer system of claim 12, wherein said flange of one module matingly and snugly engages said recess of another module.

15. The computer system of claim 14, wherein said jack of one module matingly engages said plug of another module.

16. The computer system of claim 15, said at least one circuit panel comprising a disk drive.

17. A computer system capable of easily extending function and including a main computer, said main computer comprising:

a connector for connecting a plurality of expansion modules, said connector projecting outwardly from a lower side of said main computer and having at least one of address, data and control lines;

a circuit panel which connects with said at least one of said address, data and control lines of said connector, and which controls operations and functions of the computer system;

a supporting section to protect said connector; and a rigid and inflexible connector panel which electrically connects said connector to said circuit panel and which extends in a direction perpendicular to said circuit panel, said connector panel including support means for receiving and supporting said circuit panel;

wherein said support means comprises at least one slot formed on said rigid and inflexible connector panel.

18. The computer system of claim 17, wherein said circuit panel is disposed horizontally between an upper side and said lower side of said main computer.

19. The computer system of claim 17, wherein said rigid and inflexible connector panel extends continuously and vertically between an upper side and said lower side of said main computer.

* * * * *